United States Patent
Richards et al.

(10) Patent No.: US 6,754,707 B2
(45) Date of Patent: *Jun. 22, 2004

(54) SECURE COMPUTER SUPPORT SYSTEM

(75) Inventors: Mark E. Richards, San Jose, CA (US); Scott William Dale, Palo Alto, CA (US); Cadir Batista Lee, Menlo Park, CA (US)

(73) Assignee: SupportSoft, Inc., Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,665

(22) Filed: Oct. 28, 1999

(65) Prior Publication Data

US 2002/0188706 A1 Dec. 12, 2002

(51) Int. Cl.[7] .............................................. G06F 15/16
(52) U.S. Cl. ...................... 709/227; 709/223; 709/228; 709/229; 710/104; 713/1; 713/100
(58) Field of Search ................................. 709/220, 221, 709/222, 223, 224, 228, 229, 227; 710/104; 713/1, 100

(56) References Cited

U.S. PATENT DOCUMENTS

| | | | |
|---|---|---|---|
| 5,678,002 A | 10/1997 | Fawcett et al. | |
| 5,727,202 A | 3/1998 | Kucala | 395/610 |
| 5,805,796 A | 9/1998 | Finch et al. | 395/183 |
| 5,806,043 A | 9/1998 | Toader | 705/14 |
| 5,809,251 A * | 9/1998 | May et al. | 709/223 |
| 5,845,077 A | 12/1998 | Fawcett | 395/200 |
| 5,884,073 A | 3/1999 | Dent | 395/652 |
| 5,884,323 A | 3/1999 | Hawkins et al. | 707/201 |
| 5,898,830 A | 4/1999 | Wesinger, Jr. et al. | 395/187 |
| 5,909,581 A | 6/1999 | Park | 395/712 |
| 5,933,646 A | 8/1999 | Hendrickson et al. | 395/712 |
| 5,960,177 A | 9/1999 | Tanno | |
| 6,049,671 A * | 4/2000 | Slivka et al. | 395/712 |
| 6,070,187 A * | 5/2000 | Subramaniam et al. | 709/220 |
| 6,108,689 A * | 8/2000 | Fagen et al. | 709/206 |
| 6,110,228 A * | 8/2000 | Albright et al. | 717/11 |
| 6,230,194 B1 * | 5/2001 | Frailong et al. | 709/220 |
| 6,289,377 B1 * | 9/2001 | Lalwaney et al. | 709/222 |

FOREIGN PATENT DOCUMENTS

| | | |
|---|---|---|
| EP | 0 713 311 A1 | 5/1996 |
| EP | 0 738 961 A2 | 10/1996 |

OTHER PUBLICATIONS

"Dell OpenManage, Frequently Asked Questions", downloaded from www.dell.com/openmangae, 2 pgs., 09/99.
"IRC FAQ, Introduction to IRC for people using Windows", downloaded from www.mirc.co.uk/ircintro, 19 pgs., 10/99.
"What is IRC?", downloaded from www.usfca.edu/comecen/ircfaq, 7 pgs., 10/99.
Pioch et al., "A Short IRC Primer", downloaded from www.irchelp.org/irchelp, 33 pgs., 10/99.
LapLink.com, FAQ & A Product, 5 pgs., 10/99.
"Why PC Clinic is the World's BEST Diagnostic Package", downloaded from www.datadepo.com/clinicbest, 3 pgs., 10/99.
"Secure Sockets Layer", Netscape Netcenter, downloaded from www.netscape.com/security/techbriefs, 2 pgs. 10/99.
"How SSL Works", downloaded from www.developer.netscape.com/tech/security, 5 pgs., 10/99.

* cited by examiner

*Primary Examiner*—Saleh Najjar
(74) *Attorney, Agent, or Firm*—Fish & Richardson P.C.

(57) ABSTRACT

A system maintains a first computer using a second computer and a central computer by: receiving a request for maintenance from a first computer; opening first and second secured connections to the first and second computers through the central computer; transferring a request for data from the second computer; storing data and a destination instruction sent from the second computer in a central computer buffer; and forwarding the buffered data to the first computer.

27 Claims, 9 Drawing Sheets

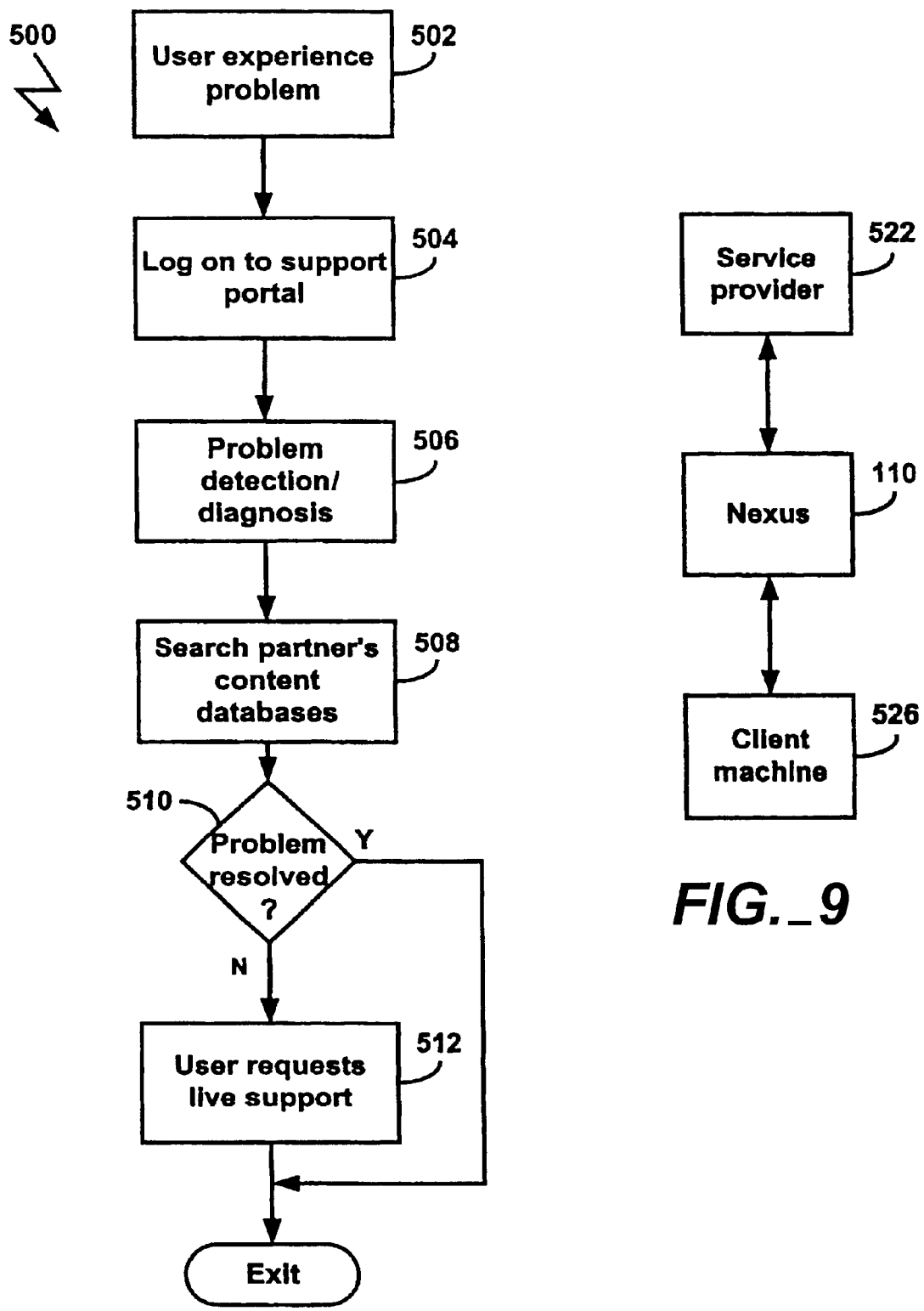
FIG._7
FIG._9

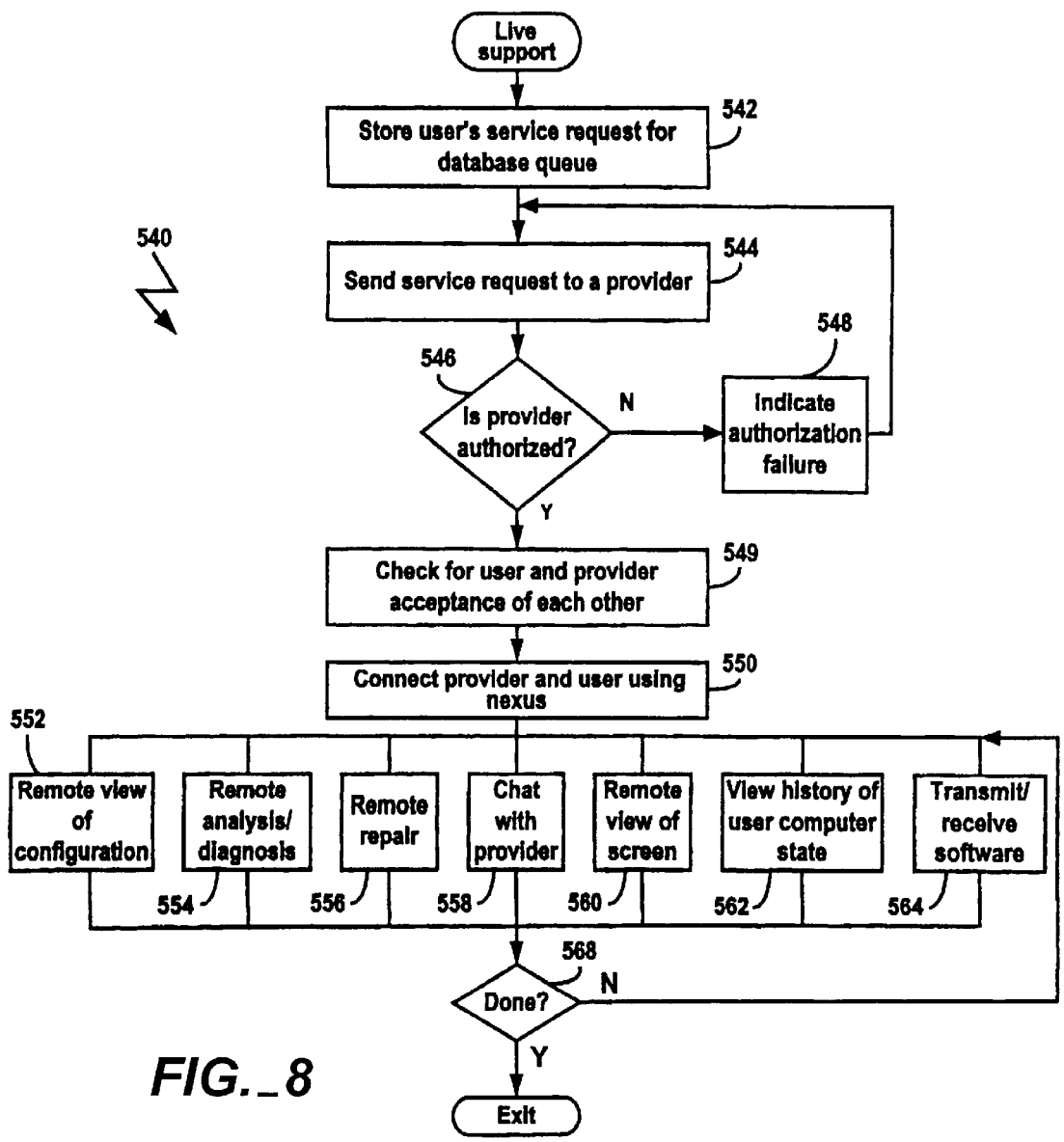
FIG._8

SECURE COMPUTER SUPPORT SYSTEM

BACKGROUND OF THE INVENTION

The advent of powerful microprocessors and supporting peripherals has allowed microprocessor-based systems to approach or, in some instances, to exceed the power of mainframes. Such microprocessor-based systems have evolved to support a wide variety of configurations with varying bus topology, memory configurations, I/O controllers and peripheral devices. Further, such computers can be networked over wide area networks such as the Internet as well as local area networks.

As microprocessor-based systems become the mainstay of businesses, the ability to maintain and manage the hardware, software, networks, operating systems, middleware and applications becomes important. In the past, a mainframe in a computing center performed centralized system management tasks, including library and configuration management and software version control, among others. Remote maintenance and management facilities are common features in mainframes, whose architectures are generally designed specifically to accommodate remote maintenance and management. However, microprocessor-based systems have evolved without such considerations and, as a consequence, they typically do not provide remote maintenance and management features.

In a computer network with diverse microprocessors, peripherals, and software applications, the range of possible configurations is staggering. Not surprisingly, system failures occur when incompatible hardware and software coexist. Acknowledging the challenge in maintaining computer hardware and software products, many manufacturers provide customers with technical support personnel who can assist users in deploying their products. The staffing of skilled software support personnel can be expensive, particularly when sufficient personnel need to be fielded to provide real time support during peak inquiry times. To limit support costs, manufacturers rely on on-line help over the Internet as a viable alternative to telephone calls as a tool for providing product support.

However, due to devices that enhance the security of networks such as firewalls, the ability to support on-line help over the Internet is typically limited to one-way communications initiated by one or more clients to a server. The firewall selectively permits the communications to pass from one network to the other, to provide bidirectional security. Firewalls have typically relied on a combination of two techniques to protect the networks: packet filtering and proxy services. In packet filtering, the firewall selectively controls the flow of data to and from a network using rules established by a network administrator that specify what types of packets such as those to or from a particular IP address or port are to be allowed to pass and what types are to be blocked. Alternatively, a proxy may be used. The proxy is a program, running on an intermediate system, that deals with servers such as Web servers and FTP servers on behalf of clients. Clients, e.g. computer applications that are attempting to communicate with a network that is protected by a firewall, send requests for connections to proxy-based intermediate systems. Proxy-based intermediate systems relay approved client requests to target servers and relay answers back to clients.

The firewalls prevent the transmission of information required to perform remote maintenance and management for computer systems. However, a detailed knowledge of a computer's dynamic environment and its system configuration is needed to prevent computer failures. For example, these situations include cases where modifications to one component to correct one problem may introduce other errors if the modifications are improperly installed. Further, an accurate knowledge of system configuration is required in order to verify compatibility and to ensure integrity across multiple operating environments and across diverse processors.

Some of the configuration information is hardware specific, such as disk controller port addresses, communication port addresses and video port addresses. Further, software specific configuration parameters may be set within configuration files for each application. For example, a configuration file stored within an IBM-compatible personal computer known as an autoexec.bat file may include path statements. Additionally, specific application software may require specific initialization information to run effectively. Typically, this information may be set in an initialization (.ini) file or in the system registry.

Once installed, the computer configuration does not remain static, however. For example, certain peripherals may be replaced, added or removed. Further, during use, users may personalize the software and thus change the state information. The difference in state information between software installation and software operation leads to an unpredictable operation and may require more support from information system personnel. The complexity of system maintenance becomes even more challenging for component-based software in which each software application is a collection of many separate files generated by unrelated software developers who may be more conscious of each component's integrity than the integrity of the assembled package. As the pace of changes increases and complexity of the software assembly process grows, the external representation of the correct state relationship between components becomes prone to error and to system failures. Moreover, as networks grow and become more heterogeneous and complex, the management of computers attached to networks becomes more challenging.

When failures occur, one option is to request a computer technician to be dispatched on-site to repair the computer. Other options include removing the computer from its normal working environment and delivering it to a computer repair facility, or fixing the computer through either adjustment or replacement of hardware, re-installation of software, modification of software parameters and the like. For large businesses having hundreds or thousands of computers interconnected together through an internal network or having a large, stand-alone computer such as a mainframe experiencing a boot error, the second option of removing the computer is not viable. Likewise, the third option is not viable if the computer user is unfamiliar with the internal workings of his or her computer. Additionally, as time is a precious resource, users typically do not like to browse manuals on-line. Since replies to emailed questions can take days, a reliance on technical support through emails is not an acceptable option for many system administrators.

Companies can maintain on-site computer technicians and other IT personnel. However, the use of on-site computer technicians poses a number of disadvantages, including high service costs due to the large overhead costs such as transportation costs, gas and insurance assumed by the computer service provider in providing on-site servicing. On occasions, on-site servicing can be a time-consuming process if the technicians are not properly trained to diagnose the problem and to perform the requisite repair. In view of the computer repair and maintenance cost, it would be advantageous to provide a remote servicing of computers in an automated fashion, to allow remote servicing by expert support staff, whether in-house or out-sourced.

SUMMARY

In one aspect, a system maintains a first computer using a second computer and a central computer by: receiving a request for maintenance from a first computer; opening first and second secured connections to the first and second computers through the central computer; transferring a request for data from the second computer; storing data and a destination instruction sent from the second computer in a central computer buffer; and forwarding the buffered data to the first computer.

Implementations of the invention includes one or more of the following. The central computer is a nexus. The secured connection of the first computer can remain open without network traffic. The first computer can reside in a secured area. A process can be spawned on the first computer in response to the request from the second computer. The spawned process can collect data on the first computer in accordance with the request from the second computer. The request can execute diagnostic software on the first computer. The request can also execute repair software on the first computer, or can provide information on configuration, state or screen display to the second computer. The request can also cause software to be downloaded or uploaded to the first computer. One of the first computer or the second computer can reestablish a connection in the case that the connection is interrupted. The first computer can reside inside a firewall.

In a second aspect, an apparatus provides maintenance for one or more computers connected to a nexus. The apparatus includes a first computer connected to the nexus, the first computer residing inside a secured area. A second computer can be connected to the nexus. The nexus supports a secured communication session between the first and second computers, the communication session being related to the operation of the first computer and established in response to a request from the first computer.

Advantages of the present invention include the following. The system supports convenient and transparent maintenance operations across an enterprise's networks. These operations are supported using a nexus, which allows a service provider to service a user computer even if a firewall exists. By allowing the transmission of the user computer's configurational and state information over the Internet, the system reduces state relationship errors and, in the event one crops up, the system can automatically correct these errors. The system can be used to diagnose problems by comparing an existing state on a user computer to both a previously working state and a reference state known by the system. Further, the system can be used to allow applications which have been damaged to self-heal by automatically restoring previously working states or reinstalling components from reference states. A further advantage of the system is reduced network traffic. The system avoids the need to poll servers and can handle the synchronous communication and require little network bandwidth to connect to the remote system.

The system can also support remote and disconnected users by protecting applications on their desktop and ensuring that software is configured appropriately. The system can also synchronize user desktops by automatically updating all application components and configuration settings while still allowing custom settings for the user. The system also automates custom computer setups/upgrades by providing replication of working states from client machines. Information transmitted through the nexus may be used to provide vital application information including system values and resource conflicts to help information systems personnel.

Further, the system decreases network overhead and increases scalability of electronic software distribution by eliminating delivery of duplicate files that make up software packages. The flexible architecture of the invention protects user investment in existing solutions for enterprise-wide systems management, network management, and application management.

The system also assists manufacturers in meeting their expected service levels to customers. Computer system configuration costs are reduced, while system failures are reduced. The invention also improves systems security management. The invention also provides timely notification that a change is available, identification of which systems require updates and updates of all systems in a timely and efficient manner. The network monitoring allows users to identify potential problems before they occur and provides administrators an opportunity to fix systems before they fail. Thus, computer systems work more efficiently with less down time and at a potentially lower total cost.

BRIEF DESCRIPTION OF DRAWINGS

FIG. 7 is a flowchart illustrating a user maintenance process.

FIG. 8 is a flowchart illustrating a process in FIG. 7 where a service provider can run various diagnostic, repair and maintenance operations on the user's computer.

FIG. 9 is a diagram illustrating an exemplary maintenance configuration for the nexus of FIG. 1.

DESCRIPTION

Figure 1:
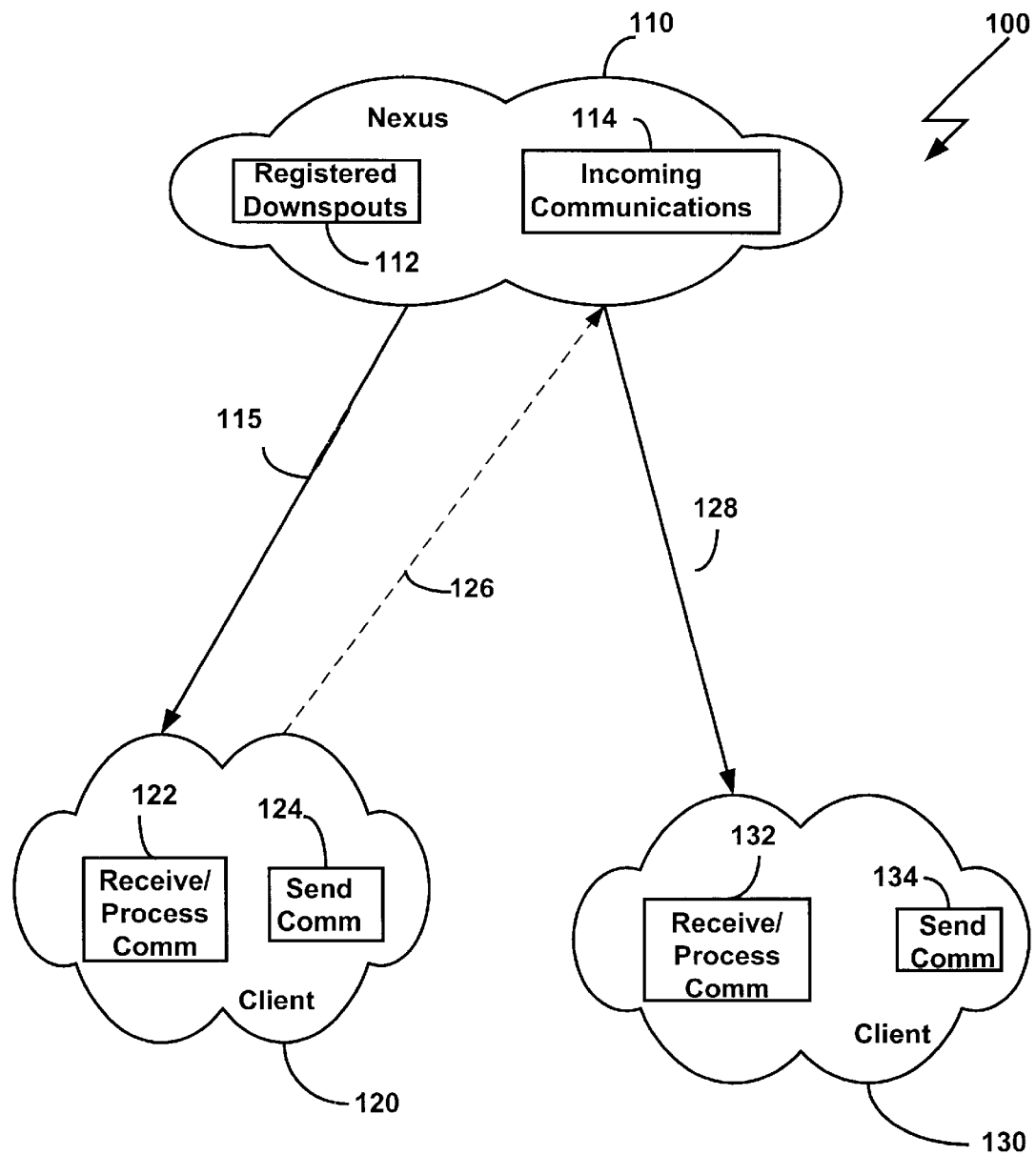
FIG. 1 is a diagram illustrating a system with a nexus in accordance with one aspect of the invention.

FIG. 1 illustrates a system 100 that facilitates communication between two or more client software programs across a wide area network where they would normally not be able to communicate with each other. A nexus 110 is provided to facilitate communications between two or more client software programs across wide area networks, including the Internet, where they would normally not be able to communicate with each other.

The nexus 110 facilitates a secure communication between computers over the network, any of which may reside in a secured domain, regardless of their ability to communicate directly with each other. Client software applications may reside at independent locations on the Internet, behind firewalls, proxy servers, and/or with private Internet addresses. These client programs cannot normally communicate with each other over the Internet. The Internet utilizes Transmission Control Protocol/Internet Protocol (TCP/IP) as a standard for transmitting information. Through the Internet, users may transmit messages to other users through electronic mail (e-mail) and browse web pages. The nexus 110 allows these client programs to communicate by acting as a central junction, where communications are sent and relayed to the appropriate client program.

The nexus 110 maintains a table 112 for registered downspouts such as downspout 115 and 128. Additionally, the nexus provides an incoming communications module 114 for handling incoming communications. Through the downspouts 116 and 128, the nexus 110 communicates with two or more clients 120 and 130. The client 120 has a receive/process communication module 122 and a send communication module 124. Correspondingly, the client 130 has a receive/process communication module 132 and a send communication module 134. The clients 120 and 130 receive downspouts 115 and 128, which relay information from the nexus 110. The information carried by the downspouts 115 and 128 can include data as well as statistical and controlled information. To communicate with the client 130, the client 120 sends an upspout 126 through its send communication module 124. The information relayed through the upspout 126 is handled by the nexus incoming communications module 114. The incoming communication module 114 in turn relays the message transmitted by the client 120 through the downspout 128.

Client programs register with the nexus 110 to receive communications from the nexus 110. Upon registration with the nexus 110, the downspout 115 is created between the nexus 110 and the client 120. The downspout 115 is used to relay communications between the nexus 110 and the client 120. The client 120 can then send "through" communications on a separate, one time connection, to the nexus 110, targeted towards another client such as the client 130. The nexus 110 receives "through" communications, determines the appropriate destination client, and forward the communication on the destinations client's registered downspout. If a client needs to send a response back to the originating client, a new "through" communication is created and targeted towards the originating client. The nexus 110 can receive and process multiple simultaneous client communications through multiple threads of execution. Multiple nexus servers can be created and pooled together to achieve further scalability. The nexus 110 also supports secure communication using the Secure Socket Layer (SSL) protocol, which is an industry standard protocol, and other suitable encryption processes.

The SSL security protocol provides data encryption, server authentication, message integrity, and optional client authentication for a TCP/IP connection. SSL comes in two strengths, 40-bit and 128-bit, which refer to the length of the "session key" generated by every encrypted transaction. The longer the key, the more difficult it is to break the encryption code. Most software supports 40-bit SSL sessions, and the latest browsers, including Netscape Communicator 4.0, enable users to encrypt transactions in 128-bit sessions. The secure communications ensures that only the destination client can receive and interpret the communication. No other computer can interpret the data sent from the originating client.

Figure 2:
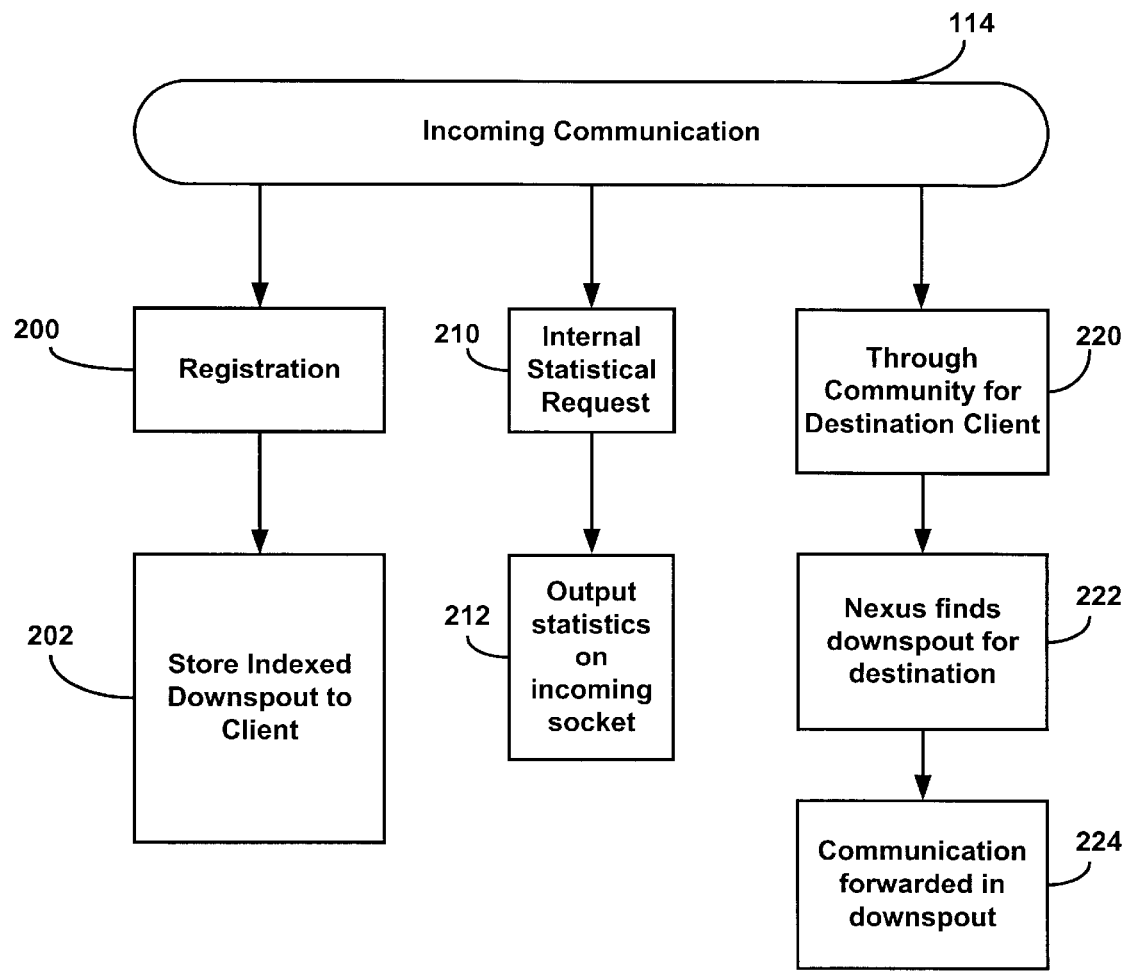
FIG. 2 is a diagram illustrating processes operating within the nexus of FIG. 1.

Referring now to FIG. 2, a block diagram of the incoming communication module portion 114 of the nexus 110 is illustrated. The incoming communication module 114 has a registration process 200 that communicates with a table 202. The table 202 stores index downspouts for the clients 120 and 130, respectively. The incoming communication module 114 also has an internal statistical request process 210. The internal statistical request process 210 communicates with a process 212 that outputs statistics on incoming data communication upon request. The incoming communication module 114 also has a process 220 that handles communications through the community for a destination client. Upon receipt of a transmission through the community, the process 220 forwards the request to a process 222, which locates an appropriate downspout for the destination. The process 220 in turn forwards the communication to the downspout through a process 224.

Figure 3:
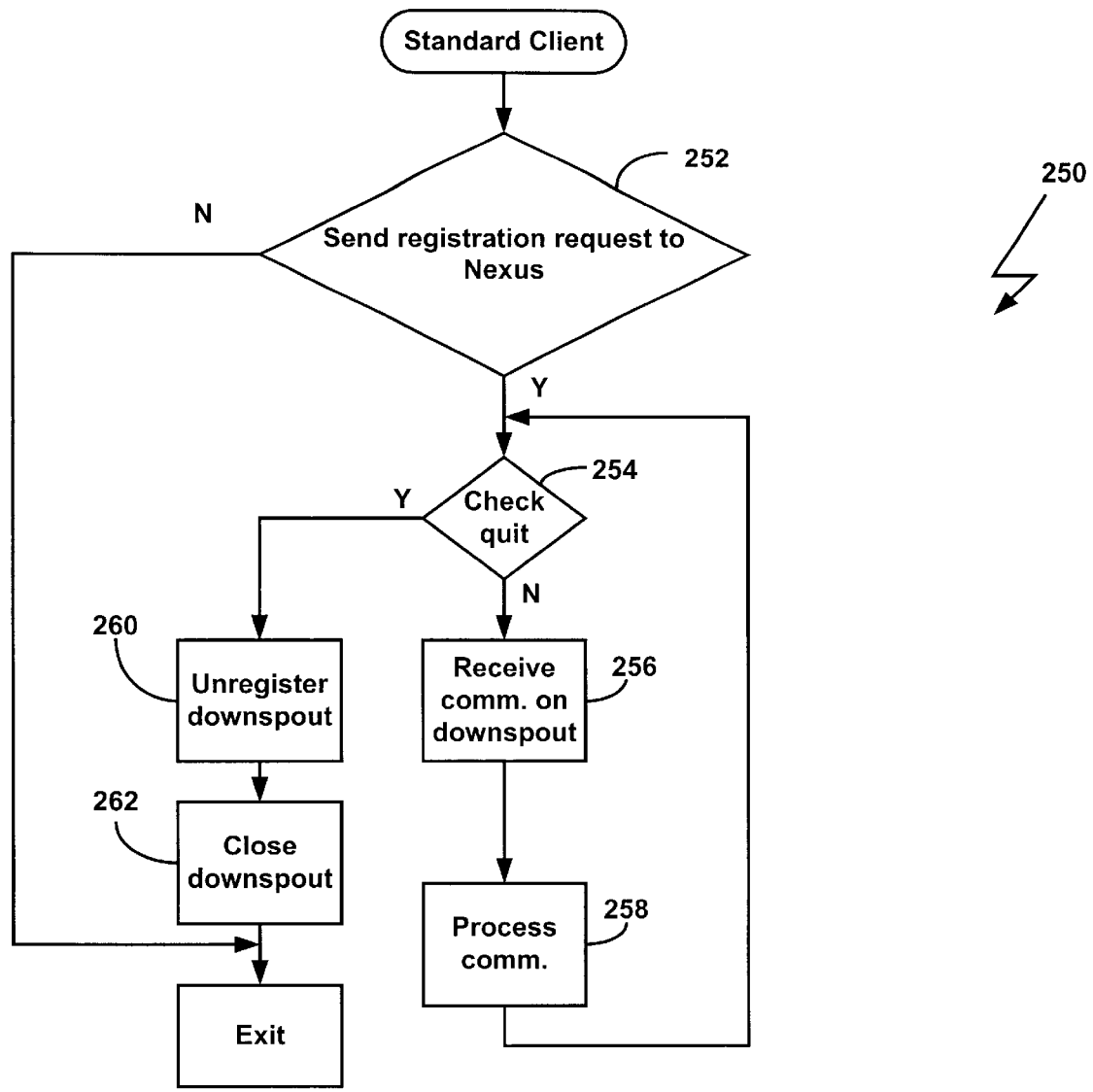
FIG. 3 is a flowchart illustrating a process executing on a blocking client.

Referring now to FIG. 3, a flowchart illustrating operations carried out in a standard client is shown. The process 250 first determines whether a registration request is to be sent to the nexus 110 of FIG. 1 (step 252). From step 252, if the registration request is not to be sent to the nexus, the process 250 exits. Otherwise, the process 250 determines whether the client desires to terminate the connection to the nexus (step 254). If not, communications are received on a downspout (step 256) and the communication is processed accordingly (step 258). From step 258, the process 250 loops back to step 254.

From step 254, if the client desires to terminate the connection to the nexus, the downspout is unregistered (step 260). Next, the downspout is closed (step 262) before the process 250 exits.

In FIG. 3, an exception case can occur at steps 254 or 256. If the connection is severed, then the process goes back to step 252. In this manner, if a client downspout is severed, the client will automatically reestablish a new downspout with the nexus.

Figure 4:
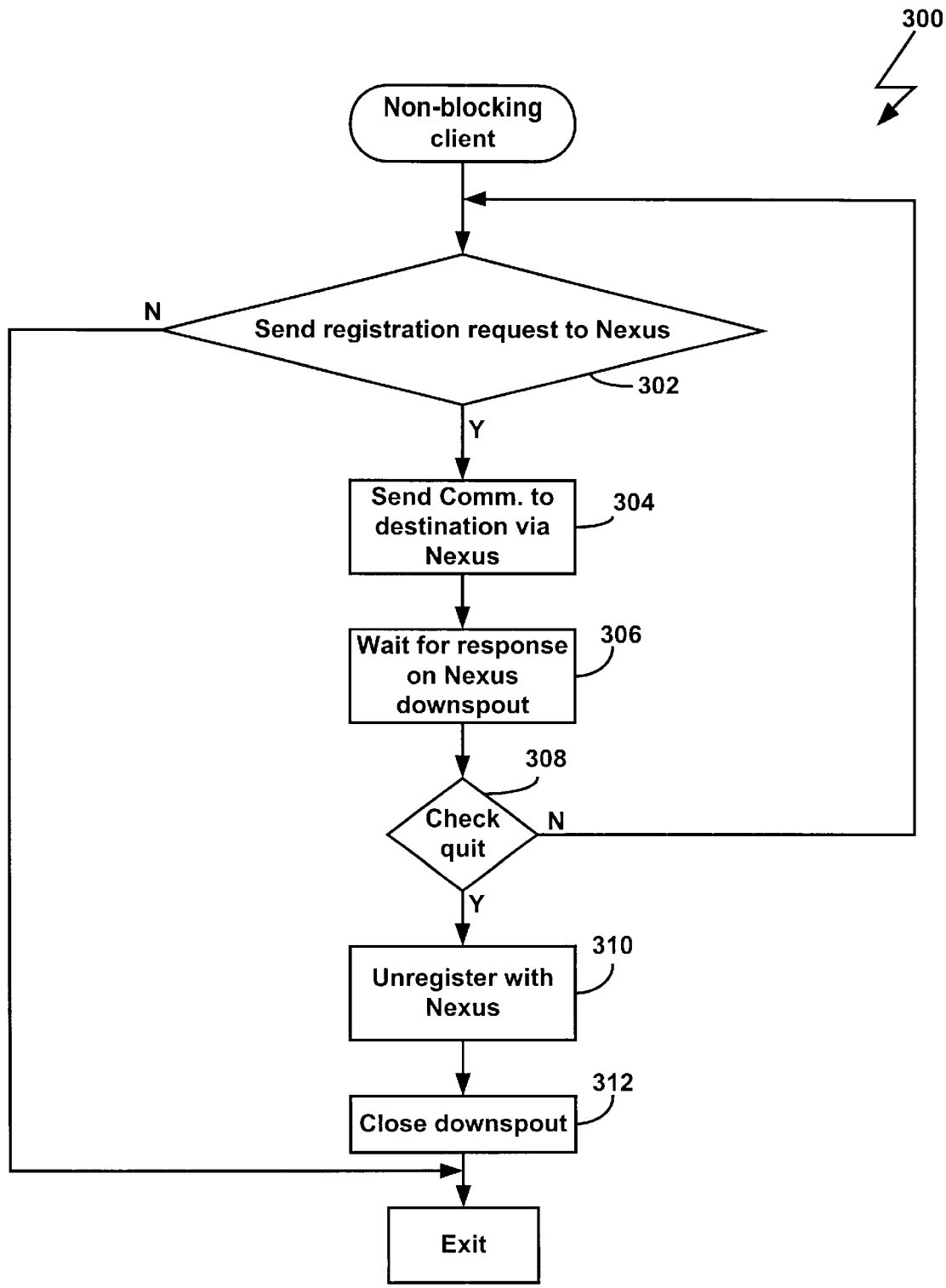
FIG. 4 is a flowchart illustrating a process executing on a non-blocking client.

FIG. 4 illustrates a process 300 that is executed by a non-blocking client. The process 300 first checks whether a registration request is to be sent to the nexus 110 (step 302). If not, the process 300 exits. Alternatively, if the registration request is to be sent to the nexus, the process 300 sends a communication request to its destination using the nexus 110 (step 304). Next, the process 300 waits for a response on the nexus downspout (step 306). The process 300 then determines whether the client desires to terminate the communication over the nexus (step 308). If not, the process 300 loops back to step 302 to continue relaying information over the nexus 110.

From step 308, if the client desires to terminate the communication over the nexus, the process 300 unregisters the client with the nexus 110 (step 310) and closes the downspout (step 312) before exiting.

Figure 5:
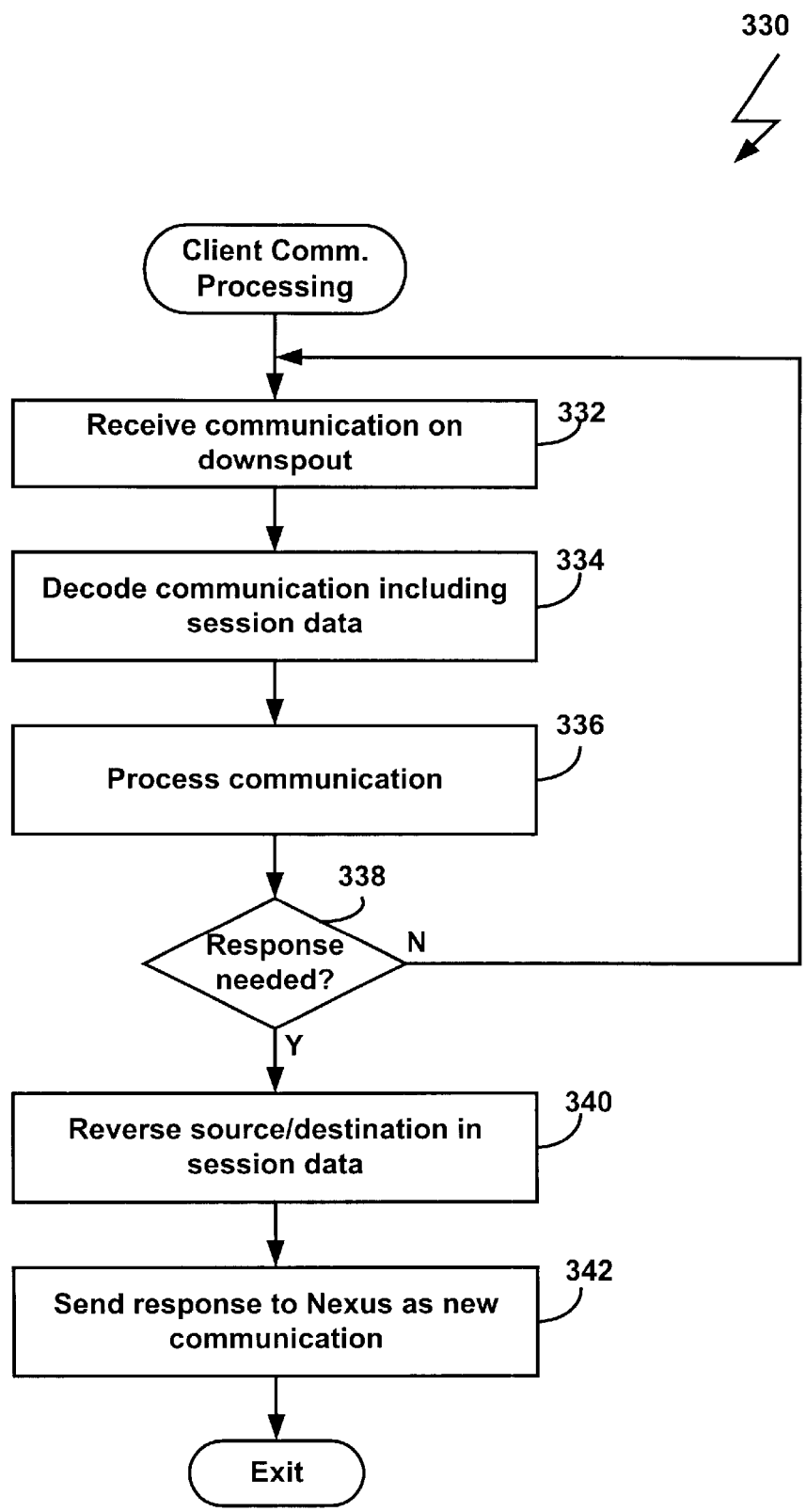
FIG. 5 is a flowchart illustrating a process for handling communications on the client side.

FIG. 5 illustrates a process 330 for handling client communication processing. The process 330 corresponds to step 258 of FIG. 3. First, the process 330 receives communications on a particular downspout (step 332). Next, the communication is decoded to extract a session data (step 334). Next, the communication is processed (step 336). Additionally, the process 330 determines whether a response is needed (step 338). If not, the process 330 loops back to step 332 to continue processing the client communications.

If a response is needed in step 338, the process 330 reverses the source destination fields in the session data (step 340). The block with the reversed source destination fields and the response are then sent to the nexus 110 as a new communication (step 342) and the process 330 exits.

Figures 6A, 6B:
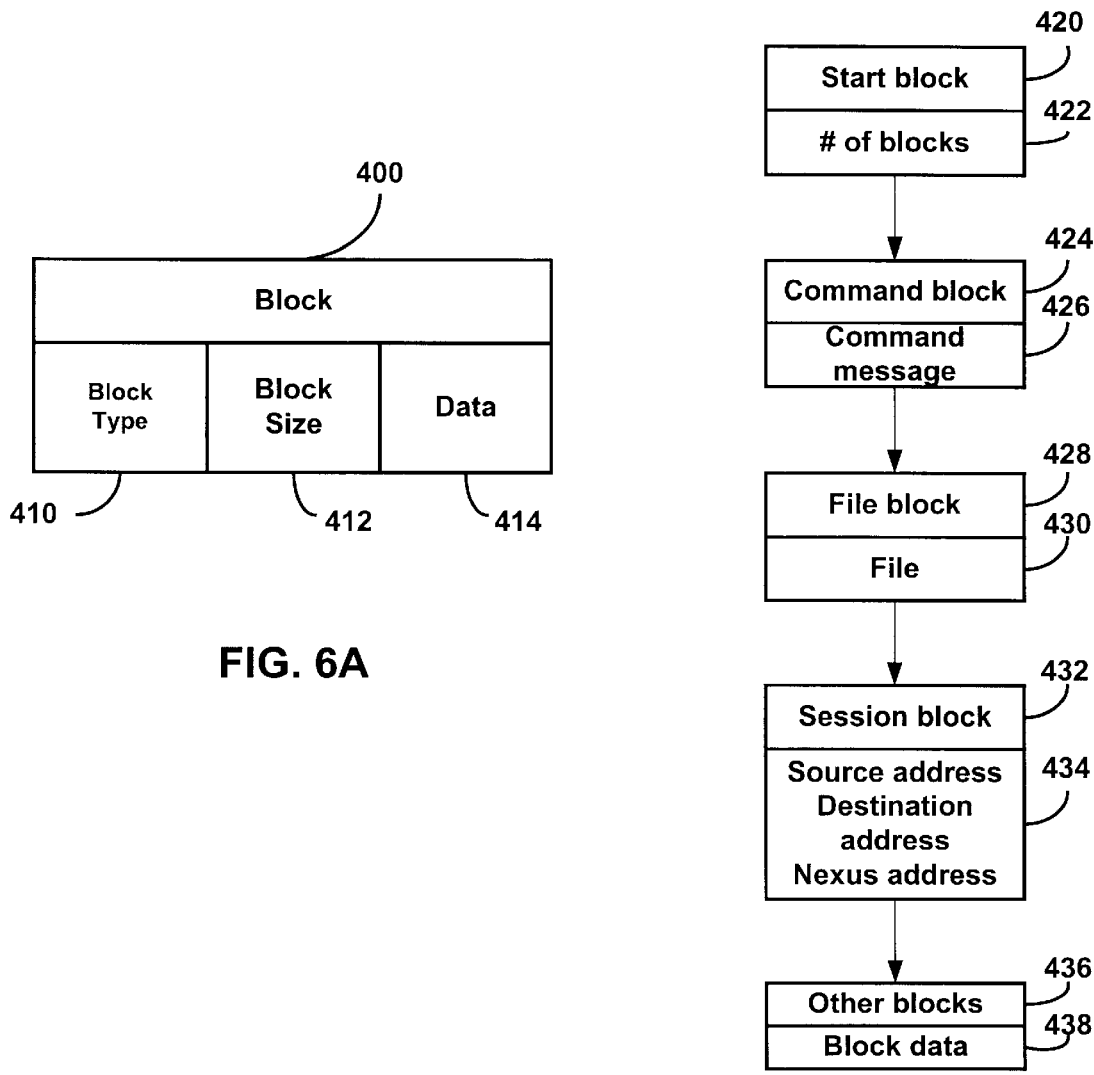
FIGS. 6A and 6B are block diagrams illustrating various data communication formats used in one embodiment.

FIGS. 6A and 6B illustrate various communications data formats used by the nexus 110 and the clients 120 and 130.

FIG. 6A shows a block 400 having a block type field 410, a block size field 412 and a data field 414. FIG. 6B shows a start block 420 that provides data on the number of blocks 422. The start block 420 is followed by command block 424 that carries one or more command messages 426. The command block 424 in turn is followed by a file block 428 that contains one or more files 430. Next, a session block 432 contains a source address, a destination address and a nexus address 434. The session block 432 in turn can be followed by other blocks 436 that carry block data 438, for instance. These blocks may be unordered or ordered.

FIG. 7 is a flowchart illustrating a process 500 for providing live support. First, a user or requester experiences a problem with his or her computer (step 502). The user in turn logs onto a support portal (step 504). The support portal provides various local intelligent self-service facilities to try and repair their problem directly. The user applies these facilities to perform problem detection and/or diagnosis (step 506). If the problem does not go away, the user then searches content located on various external databases (step 508). The external databases can be maintained by one or more third-party partners affiliated with the support portal.

From step 508, if the problem is resolved (step 510, yes), the process 500 exits. Alternatively, if the user is unsuccessful in resolving the computer problem (step 510, no), the user enters a problem description and request live support from the support portal (step 512). Step 512 is shown in more detail in FIG. 8.

Referring to FIG. 8, a process 540 for performing live support is detailed. First, a requester's service request with a problem description is received and stored in a database (step 542). The service request is put in a waiting queue. The process 500 then sends the service request to an available service provider (step 544). The process 500 also checks whether the service provider is an approved provider (step 546). If not, an authorization failure signal is sent to the user and the service provider (step 548). Another service provider is selected and the process 540 loops back to step 544 to test the next provider for authorization. If the service provider is authorized in step 546, the service provider removes the service request from the waiting queue. Also, when a provider accepts a service request from the queue, the requester is notified. The Requester then is given the choice to accept or reject the provider (step 549). Once the provider has been approved, a communication link between the provider and the requester is created using a nexus (step 550). The provider then is able to perform live remote diagnosis, repair, maintenance and chat with the requester, as discussed in more detail below.

The nexus facilitates communications between two or more client software programs across the Internet where they would normally not be able to communicate with each other. The user computer may reside at independent locations on the Internet, behind firewalls, proxy servers, and/or with private Internet addresses. The nexus allows the provider to communicate with the user computer by acting as a central junction, where communications are sent and relayed to the appropriate client program. The provider computer can send the "through" communications on a separate, one time connection, to the nexus, targeted towards the user computer. The nexus receives "through" communications, determines the appropriate destination client, and forwards the communication on the destination client's registered downspout. If a client needs to send a response back to the originating client, a new "through" communications is created, targeted towards the originating client.

A number of operations can be performed using the nexus. In one embodiment, the provider can perform a remote view and control of a requester's system information such as memory, disk, files, CPU type, operating system, printers, processes, network settings, mail settings, device settings, software, among others (step 552).

The provider can also perform remote analysis and diagnosis of the requester's computer (step 554). The provider can also perform remote change and repair of the requester's computer (step 556). This can be done by changing hardware configuration states and/or software configuration states stored in files. The process allows the provider to run remote diagnostic routines, test the remote system, and boot records to a recovery disk, transfer files (for off-site backup), and view the entire remote system's configuration. The process can also execute pattern tests on the user's main memory as well as the cache. The process can provide a snapshot display of the devices installed, and the used!available I/O and memory addresses, IRQs and DMAs. The diagnostic process can also virus-scan the user's files and shows the user if any have been altered or infected. Chat sessions can also be performed between the provider and the requester over the Internet (step 558). This could be voice chat or electronic messaging. The diagnostic process can also virus-scans the user's files and shows the user if any have been altered or infected. Chat sessions can also be performed between the provider and the requester over the Internet (step 558). This could be voice chat or electronic messaging.

The provider can also remotely view the requester's computer screen if desired (step 560). In this step, when the provider opens a remote view of the user's screen, the provider becomes a guest and the remote computer displayed on the provider's screen becomes a host. The provider starts the process by making a connection through the nexus and opening a remote control window to the user's computer. Through the nexus, the provider can act as though he or she is in front of the user's computer. Thus, keyboard and mouse movements generated by the provider are communicated to the user's computer and these operations in turn are executed by the user's computer. Screen refresh operations performed by the user's computer is trapped and screen display information is in turn forwarded to be displayed on a window at the provider's computer.

The history of state and state change of the requester's system is also available for review by the user or the provider (step 562). Based on the history of state and state change, the system can dynamically rebuild an external representation of the correct state from the components themselves. The generated application state provides complete, persistent run-time state information about the application. The generated application state may be used in installation, synchronization, backup, recovery, analysis and repair of a computer system. Because the state construction process is dynamic, the system can follow software through its entire life cycle and provide value for many management tasks that need detailed information about run-time state.

Maintenance of the current states of software applications can be provided for software installation, synchronization, backup, recovery, analysis and repair. Detailed knowledge of the computer's dynamic environment and its system configuration is used to prevent situations where modifications to one component to correct one problem may introduce other errors if improperly installed. Moreover, the accurate knowledge of system configuration allows compatibility to be verified and integrity to be maintained across multiple operating environments and across diverse processors.

The system stores detailed knowledge of each computer's environment in one or more files with metadata that is generated by determining run-time states of each software application. Generally, the metadata for each software application is an abstract representation of a predetermined set of functionalities tailored for a particular user during installation or customized during operation of the software application. The metadata is a list pointing to various software components (entities) making up an application software and a root entity that represents an action that may be performed by the user at another machine, place or time.

The metadata is generated by analyzing the run-time states of the software application and checking the existence of the entities and entity dependencies, which may change over time. The list of the entities is pruned by deleting overlapping entities and by combining similar entities. In the grouping of entities in the metadata, an intersection of the entities is determined such that a package of entities can be succinctly defined and that all the information necessary for it can be represented as the metadata with or without the actual entities. Enough information about each entity is included in the metadata so that an analysis of correctness may be performed. More information on the metadata is disclosed in the following commonly assigned applications entitled "AUTOMATIC CONFIGURATION GENERATION," filed on Dec. 18, 1997 with Ser. No. 08/993,103 and issued as U.S. Pat. No. 5,996,073 on Nov. 30, 1999, and "SOFTWARE VAULT," filed on Dec. 2, 1998 with Ser. No. 09/205,418 and issued as U.S. Pat. No. 6,163,859 on Dec. 19, 2000, the contents of which are incorporated by reference.

Additionally, the provider can transmit executable software and/or content from the provider to the requester to repair the requester's computer (step 564). Software updates can be transmitted using a wide area network such as the Internet and the nexus. In such systems, a user connects to a server or support portal containing software updates and selects or downloads desired software. Such systems allow for rapid updating of software by simply supplying a new updated version of the software to the server or support portal. However, the support portal can provide instructions for the user to select, download and install the new software. The support portal can also provide the user that has already obtained a software product with a simple, automatic way of learning of or obtaining upgrades or fixes for that product. The software provider may also have updated help files and other help utilities unknown to the user.

From steps 552–564, the process 540 checks whether the current repair session has been completed (step 568). If not, the process 540 loops back and allows the provider to execute steps 552–564. Alternatively, if the provider is finished, the process 540 exits.

FIG. 9 shows an exemplary maintenance configuration for the nexus 110 of FIG. 1. In this example, operations associated with a remote view of the configuration associated with a client computer 526 by a service provider 522 are illustrated.

After the service provider 522 and the client computer 526 are connected to the nexus 110, the service provider 522 issues a command to run on the client computer 526 to generate configuration information. The command is sent to the nexus 110 using an up-spout and targeted toward the client computer 526. After sending the command, the service provider 522 waits for a response at his or her console. Eventually, the service provider 522 receives the configuration information from a service provider down-spout and displays the information on the console to diagnose the client computer 526.

Turning now to the nexus 110, upon receiving a request for configuration command from the service provider 522 though the service provider up-spout, the nexus 110 forwards the command to the client computer 526 using a client down-spout. The nexus 110 then waits for additional commands from the service provider 522 or for responsive data from the client computer 526. Upon receipt of data from the client computer 526, the nexus 110 forwards the configuration results to the service provider 522 using the service provider down-spout. Then, the nexus 110 waits for more commands or data transmission.

Turning now to processes operating on the client computer 526, upon receipt of a configuration command, the client computer 526 processes the configuration command. In one embodiment, the client computer 526 spawns a process that determines the system's configuration. The results of configuration-determination process are gathered by the client computer 526. The client computer 526 then sends a command containing the configuration information to the nexus 110 targeted towards the service provider 522. After sending the command, the client computer 526 waits for additional commands from the nexus 110.

In the above embodiment, the client computer 526 and the nexus 110 are in a constant waiting state for commands, while the service provider 522 does not wait. Other implementations can allow the service provider 522 to wait for commands in a queued fashion, or to only wait for a response command after issuing an originating command.

Although the above embodiment supports a remote view of the client computer's configuration, other operations such as remote view of client screen, view of history, view of user computer state, transmit/receive of software, and remote repair are supported by varying the type of command and the response information that is sent between the service provider 522 and the client computer 526.

In one embodiment, the initiation of a chat message can occur at either the client computer 526 or service provider 522, while the remaining transactions can originate from the service provider 522.

In another embodiment, transactions that affect change on the client's system can record changes on the client computer 526 in a history log on the client computer 526. Also, if a server is available, the record of changes is also posted to the server. Additionally, information relating to a particular chat session, including all communication between both parties, may be recorded on the client and posted to a server if available.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Figure 10:
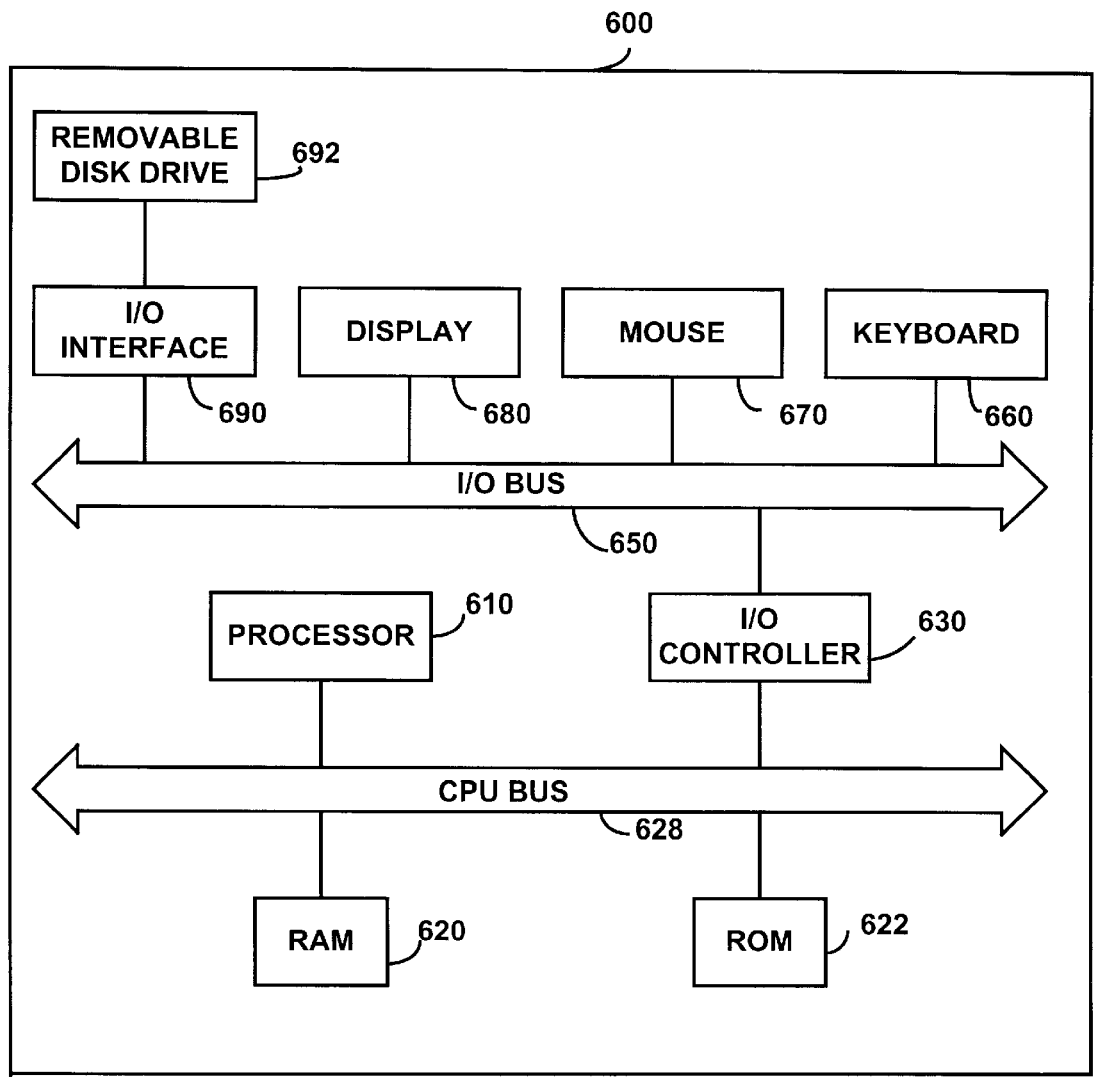
FIG. 10 shows an exemplary computer system that can be maintained in accordance with the present invention.

FIG. 10 illustrates one such computer system 600, including a CPU 610, a RAM 620, a ROM 622, and an I/O controller 630 coupled by a CPU bus 628. The I/O controller 630 is also coupled by an I/O bus 650 to input devices such as a keyboard 660 and a mouse 670, output devices such as a monitor 680 and I/O interface 690 coupled to, for example, removable disk drive 692. Variations are within the scope of the following claims. For example, instead of using a mouse as the input devices, a pressure-sensitive pen or tablet may be used to generate the cursor position information.

Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A method to maintain a first computer using a second computer and a central computer, the method comprising:
   receiving at a central computer a request for maintenance from a first computer, the first computer residing inside of a first secured area behind firewalls, proxy servers or private Internet addresses;
   establishing a persistent connection between the first computer and the central computer;
   the central computer determining for the first computer an appropriate second computer to provide maintenance to the first computer, the second computer residing inside a second secured area behind firewalls, proxy servers or private Internet addresses, and the central computer residing outside the first secured area and residing outside the second secured area;
   in response to initiation by the central computer, opening a secure connection between a second computer and the central computer;
   transferring, in response to the request for maintenance, a request for data from the second computer to the first computer through the central computer; and
   transferring the data from the first computer to the second computer.

2. The method of claim 1, wherein the central computer is a nexus.

3. The method of claim 1, wherein the persistent connection of the first computer remains open without network traffic.

4. The method of claim 1, further comprising spawning a process on the first computer iii response to the request from the second computer.

5. The method of claim 4, wherein the spawned process collects the data on the first computer in accordance with the request from the second computer.

6. The method of claim 1, wherein the request for maintenance spawns a process that executes diagnostic software on the first computer.

7. The method of claim 1, wherein the request for maintenance spawns a process that executes repair software on the first computer.

8. The method of claim 1, wherein the request for maintenance spawns a process that provides information on configuration, state or screen display of the first computer to the second computer.

9. The method of claim 1, wherein the request for maintenance spawns a process that results in the transmission of software to and from the first computer.

10. The method of claim 1, wherein one of the first computer or the second computer reestablishes a connection with the central computer in the case that the connection is interrupted.

11. The method of claim 1, further comprising registering the first computer with the central computer to enable the transfer of the request for data from the second computer to the first computer.

12. The method of claim 1, further comprising:
   registering the first computer with the central computer;
   identifying the first computer with an address; and
   using the address, enabling the transfer of the request for data from the second computer to the first computer.

13. The method of claim 1, further comprising:
   transferring a request for configuration and maintenance data from the second computer to the first computer through the central computer; and
   transferring the configuration and maintenance data from the first computer to the second computer.

14. A system with an apparatus adapted to maintain one or more computers, comprising:
   a first computer residing inside a first secured area behind firewalls, proxy servers or private Internet addresses;
   a nexus to initiate and support a persistent connection with the first computer in response to receiving a re-guest for maintenance from the first computer, the nexus determining an appropriate second computer to provide maintenance to the first computer, and establishing a secured communication session between the first computer and the second computer,
   wherein the second computer resides inside a second secured area behind firewalls, proxy servers or private Internet addresses, and wherein the nexus resides outside of the first secured area and outside the second secured area.

15. The system of claim 14, wherein the nexus is a server.

16. The system of claim 14, wherein the persistent connection between the first computer and the nexus remains open without network traffic.

17. The system of claim 14, further comprising a module to spawn a process on the first computer in response to a request from the second computer.

18. The system of claim 17, wherein the spawned process collects data on the first computer in accordance with the request from the second computer.

19. The system of claim 14, wherein the request spawns a process that executes diagnostic software on the first computer.

20. The system of claim 14, wherein the request spawns a process that executes repair software on the first computer.

21. The system of claim 14, wherein the request spawns a process that provides information on configuration, state or screen display of the first computer to the second computer.

22. The system of claim 14, wherein the request spawns a process that results in the transmission of software to and from the first computer.

23. The system of claim 14, wherein one of the first computer or the second computer reestablishes a connection with the nexus in the case that the connection is interrupted.

24. The system of claim 14, the first computer being registered with the nexus.

25. The system of claim 17, wherein the spawned process collects configuration and maintenance data on the first computer in accordance with the request from the second computer.

26. A nexus adapted to establish a through connection between a first and second computer, the nexus operable to run:
- a registration process operable to register a first computer and save registration information upon receiving a maintenance request from the first computer, the first computer residing inside a first secured area behind firewalls, proxy servers or private Internet addresses;
- a first connection process operable to open a persistent connection between the nexus and the first computer;
- a second connection process operable to determine for the first computer an appropriate second computer to provide maintenance to the first computer, and establish, upon initiation by the central computer, a secure connection between the second computer and the nexus, the second computer residing outside of the first secured area, inside a second secured area behind firewalls, proxy servers or private Internet addresses, the nexus residing outside the first secured area and the second secured areas;
- a third connection process operable to use the registration information to establish a through, persistent connection between the first and second computers.

27. A method to maintain a first computer using a second computer and a central computer, the central computer:
- receiving a request for maintenance from a first computer, the first computer residing inside of a first secured area;
- establishing a persistent connection between the first computer and the central computer;
- determining an appropriate second computer to provide maintenance to the first computer;
- opening a secured connection between the central computer and the second computer, the second computer residing outside of the first secured area inside a second secured area and the central computer residing between the first and second secured areas, the first and second secured areas residing behind firewalls, proxy servers or private Internet addresses;
- transferring the request for maintenance from the first computer to the second computer and providing a response to the first computer from the second computer.

* * * * *